United States Patent [19]

Adams et al.

[11] Patent Number: 5,679,385

[45] Date of Patent: Oct. 21, 1997

[54] APPARATUS FOR TREATING AN OPHTHALMIC LENS MOLD

[75] Inventors: Jonathan Patrick Adams, Jacksonville; Edmund C. Rastrelli; John C. Heaton, both of Atlantic Beach; Kenneth John Weber; Thomas John Wagner, both of Jacksonville, all of Fla.

[73] Assignee: Johnson & Johnson Vision Products, Inc., Jacksonville, Fla.

[21] Appl. No.: 534,918

[22] Filed: Sep. 28, 1995

Related U.S. Application Data

[60] Division of Ser. No. 225,293, Apr. 8, 1994, Pat. No. 5,573,715, which is a continuation-in-part of Ser. No. 992,884, Dec. 21, 1992, Pat. No. 5,326,505.

[51] Int. Cl.$^6$ ............................................. B29C 33/58
[52] U.S. Cl. ............... 425/174.4; 264/1.36; 264/2.3; 264/85; 425/210; 425/412; 425/436 R; 425/806; 425/808
[58] Field of Search .................. 425/174, 174.4, 425/412, 420, 210, 436 R, 808, 215, 806, 436 RM; 264/1.36, 2.3, 2.2, 85, 161

[56] References Cited

U.S. PATENT DOCUMENTS

| | | |
|---|---|---|
| 3,423,488 | 1/1969 | Bowser ............................ 264/85 |
| 4,468,184 | 8/1984 | Rawlings ......................... 264/85 |
| 4,609,507 | 9/1986 | Wichterle et al. ................ 264/85 |
| 5,158,718 | 10/1992 | Thakrar et al. ................. 425/808 |

OTHER PUBLICATIONS

Wettermann, Robert P., Medical Device & Diagnostic Industry, "Electrical Surface Treatment of Medical Plastics", Oct., 1990.

Primary Examiner—Jay H. Woo
Assistant Examiner—Joseph Leyson

[57] ABSTRACT

An apparatus for causing the polymerized excess monomer to separate from a molded lens by increasing the surface energy of the flange area of one mold piece, causing the polymerized excess monomer to stick thereto. Specifically when manufactured under inert atmosphere conditions, a particular manifold is needed to supply an oxygen bearing gas, air, to the area to be treated while preventing the oxygen from contaminating the lens manufacturing area of the molds or diluting the nitrogen atmosphere of other lens process areas. It has been found that generation of the ionized oxygen by means of a corona treatment electrode sufficiently increases the adherence of the polymer to the mold piece so treated. In the preferred embodiment, the flange around the convex, male piece of the lens mold is corona treated so that when the mold pieces are separated after lens polymerization, the flashing of excess polymerized material surrounding the lens cavity adheres to that male, convex piece flange while the lens is removed with the female, concave piece.

3 Claims, 5 Drawing Sheets

APPARATUS FOR TREATING AN OPHTHALMIC LENS MOLD

CROSS REFERENCE TO RELATED APPLICATIONS

This is a divisional application of application Ser. No. 08/225,293, filed Apr. 8, 1994, now U.S. Pat. No. 5,573,715, which is a continuation-in-part of application Ser. No. 07/992,884, filed Dec. 21,1992 now U.S. Pat. No. 5,326,505.

BACKGROUND OF THE INVENTION

This invention relates to a method and apparatus for the improved removal of molded ophthalmic lenses from the mold in which they are produced. In particular, this invention is suited to molded ophthalmic lenses such as hydrogel contact lenses, although the method is also suitable for other small, high-precision ophthalmic lenses such as intraocular lenses.

Soft ophthalmic lenses for placement on the cornea or within the eye, such as contact lenses or soft intraocular lenses, can be made by a variety of techniques. Contact lenses can be made by spin casting a monomer material in a rotating mold then polymerizing the material so shaped. Another method used to manufacture both contact lenses and intraocular lenses is precision lathing of a piece of material which is then polished and used as a lens.

Recently the molding of soft contact lenses and soft intraocular lenses has come into favor. This technique has the advantages of repeatability and speed that compares favorably with the prior methods of manufacturing lenses. Techniques for successfully molding such lenses can be found in U.S. Pat. Nos. 4,495,313 and 4,640,489 to Larsen and 4,889,664; 4,680,336 and 5,039,459 to Larsen et. al. These patents specifically described the use of a diluent, a material which substitutes for water during the molding process, and which is replaced with water after the molding has been completed. The advantage of this technique is that the optical properties, size and shape of the lens thus made does not change as radically as with methods that do not utilize such diluent.

It is further known in the art to mold such ophthalmic lenses by forming a monomer or monomer mixture in a mold such as one made from polystyrene or polypropylene.

An example of this art can be found in U.S. Pat. No. 4,565,348 to Larsen. Discussed therein is the requirement for a polystyrene mold that the materials, chemistry and processes be controlled so that the mold pieces do not require undue force to separate by sticking to the lens or to each other.

In contrast to the above polystyrene molds, another example is the use of polypropylene or polyethylene molds such as that described in U.S. Pat. No. 4,121,896 to Shepherd.

A particular problem, however, is that the monomer or monomer mixture is supplied in excess to the concave mold piece. Upon mating of the molds, thereby defining the lens, the excess monomer or monomer mixture is expelled from the mold cavity and rests on or between the flange of one or both mold pieces forming an annular ring or flashing around the formed lens.

After separating the two-mold pieces, the peripheral flashing of now polymerized excess material usually remains with the female mold piece, the same piece that holds the lens. In order to further process the lens through hydration, inspection, packaging, sterilization, etc., it is necessary to remove the flashing of polymerized material from the female mold piece. When the flashing remains with the female mold piece with the lens, it is manually picked off with the finger.

It is the object therefore of the present invention, to present a means for removing an ophthalmic lens from the mold in which it is held, along with the surrounding flashing without human intervention. This invention greatly simplifies this portion of the lens making process by reducing cost, increasing throughput and allowing for automation.

More specifically, it is an object of the present invention to provide a method and apparatus for separating an ophthalmic lens from a flashing when the mold pieces are separated.

SUMMARY OF THE INVENTION

The above objects are accomplished by providing a method and apparatus that directs accelerated electrons to at least part of one surface of one of the mold pieces prior to filling with monomer and lens polymerization. The mold pieces contain on one piece an edge that makes line contact with the other piece, such that when the two pieces are mated a cavity is formed therebetween to form the lens. In particular it has been found that generation of the ionized oxygen by means of a corona treatment electrode sufficiently increases the adherence of the polymer to the mold piece so treated. In the preferred embodiment, the flange around the convex, male piece of the lens mold is corona treated so that when the mold pieces are separated after lens polymerization, the flashing of excess polymerized material surrounding the lens cavity adheres to that male, convex piece flange while the lens is removed with the female, concave piece. A process gas flow manifold supplies nitrogen and air while drawing a vacuum to ensure the appropriate cover gas on mold portions during the corona treatment.

DESCRIPTION OF PREFERRED EMBODIMENT

It has been found that the adhesion of the polymerized monomer material to the mold in which it is formed and polymerized is related to the surface energy of the mold material. Surface energy, a material property analogous to the surface tension of a liquid, determines the wettability of the material and is measured in dyne per centimeter.

The surface energy of a material can be determined by a contact angle measurement. By measuring the contact angle of a liquid droplet on a solid surface using a goniometer, the surface energy can be determined. The smaller the contact angle measured the more wettable the surface.

Figure 1A:
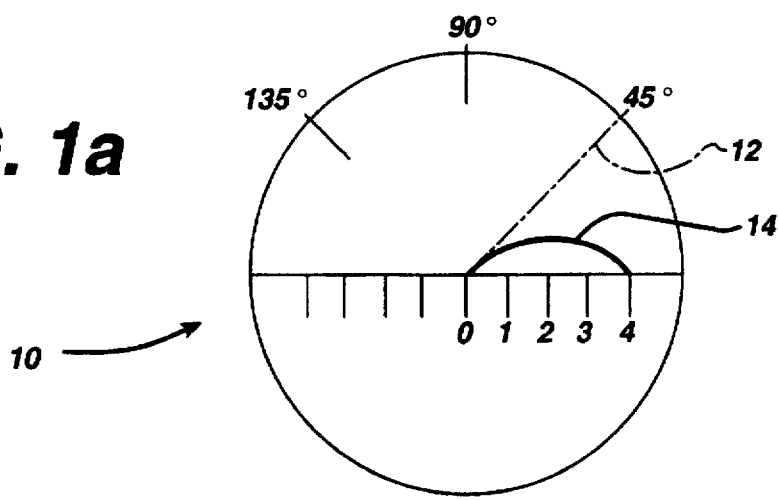
FIGS. 1a, 1b, and 1c show a characteristic of liquid/solid surface interaction modified by the present invention and a means of its measurement.
Figure 1B:
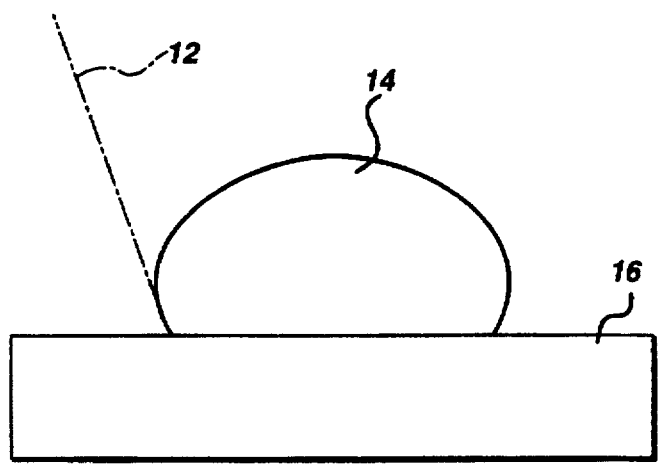
Figure 1C:
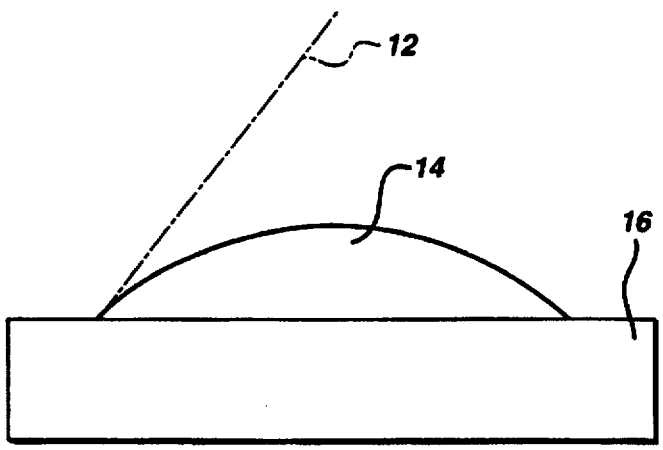

Referring to FIG. 1a, there is shown the typical goniometer scale 10 indicating the contact angle 12 formed by liquid droplet 14. FIG. 1b shows liquid droplet 14 on a substrate 16 having poor surface wettability for this particular liquid forming contact angle 12 which is much greater than 90°. Referring to FIG. 1c, there is again shown liquid droplet 14 and substrate 16, in this case with good surface wettability. In contrast to FIG. 1b, here the contact angle is less than 60° indicating a material that has a surface energy exceeding the wetting liquids surface tension by at least ten dyne per centimeter.

Because the wettability of a liquid on a substrate surface is not strictly a function of the substrate's surface energy, but rather the result of the difference between the substrate and the wetting liquid, the surface energy alone, although an indication of wettability, cannot be used alone as the ultimate indicator of the contact angle for all liquids.

In the preferred embodiment of the present invention where polystyrene molds are used to form an etafilcon A, a 58% water content hydrogel contact lens, the polystyrene has a surface energy of 40 dyne per centimeter. Experimentally, it has been shown that the prepolymer for the etafilcon A material (in combination with the boric acid ester diluent to taking the place of water during the molding process described in the patents identified in the Background section) in contact with a polystyrene surface has a contact angle between 28° and 30°.

Methods for increasing the surface energy of polystyrene and other plastics include flame treatment, plasma and chemical etching and electrical surface treatment. The method employed in the preferred embodiment is electrical surface treatment, otherwise referred to as corona treatment. It has been found that monomer polymerized on a surface to which accelerated electrons have been directed, binds to the treated surface. In particular a monomer comprising hydroxyethyl methacrylate (HEMA), methacrylic acid (MMA), ethylene glycol methacrylate (EGDMA) and trimethylolpropane trimethacrylate (TMPTMA), when polymerized forming the ionic, 58% water-content, Group IV hydrogel polymer known as etafilcon A, will adhere to a mold surface made of high quality polystyrene having directed thereto accelerated electrons toward the polystyrene surface by corona treatment. It is believed that this effect is caused indirectly by the electrons ionizing oxygen which then interacts with the polymer mold.

In effecting this method, an apparatus includes a set of electrodes which conform to the area where treatment is desired, a high voltage transformer and a high frequency generator with impedance matching electronics. The operating frequency is adjusted based on impedance up to 25 kHz operating from 14 to 50 kV. With this combination of high frequency and high voltage, it is possible to maintain a distance of about 1½ inches and a relatively short treatment time by making the plasma between the electrodes fairly intense.

After treatment the contact angle between the above described etafilcon A monomer and polystyrene is between 6° and 12°. This corresponds to a surface energy increase in the polystyrene to between 65 and 70 dyne per centimeter.

Figure 2:
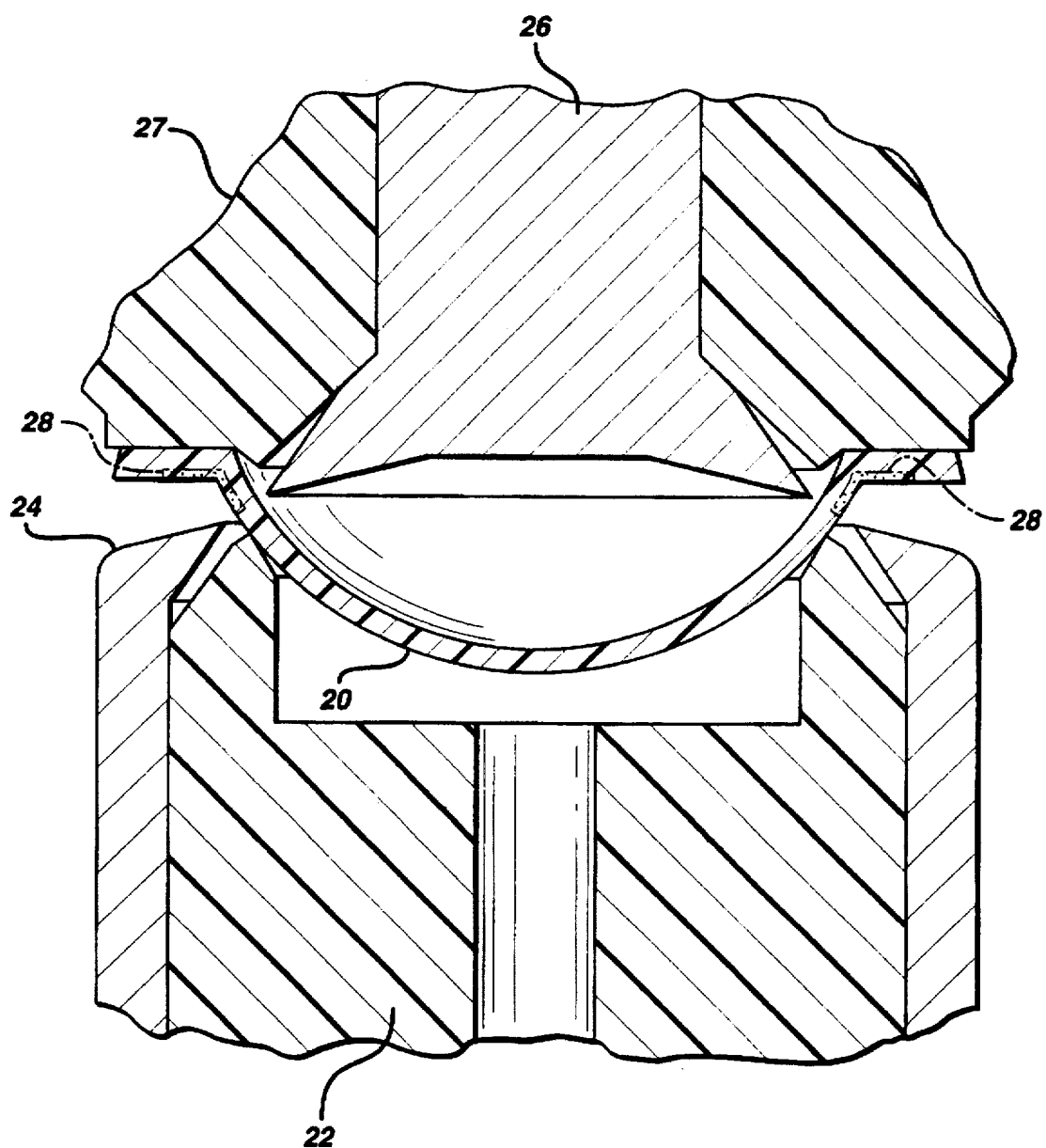
FIG. 2 is an enlarged cross-section of the electrodes of the present invention along with male mold work piece.

Referring now to FIG. 2 there is shown a specific embodiment for implementing the invention on polystyrene mold pieces constructed according to the references in the background section. There is shown in this Figure, convex male mold piece 20 intended for treatment. This male mold piece 20 is held in place by piece support 22. This piece support is constructed of an electrically non-conductive material such as poly(ethylene terephthalate) and is generally cylindrical in shape. Exterior to the piece support 22 is electrode 24 which is close to, but does not touch, the mold piece 20.

Located generally on the opposite side of male mold piece 20 from electrode 24 is counter-electrode 26. This counter-electrode is also generally cylindrical in shape but with a hollow interior. This counter-electrode touches the flange area of the male mold piece 20 and has a surface which extends to the interior convex surface of the mold piece proximate, but not touching, the back surface of the male mold piece generally opposite the position of electrode 24.

This results in the area of treatment indicated as 28.

The space between the electrode and the area of treatment ranges between 0.0 and 0.05 inches, while the area between the counter-electrode and the back surface of the male mold piece 20 ranges from 0 (in contact) to about 0.075 inches in the area of treatment.

Figure 3:
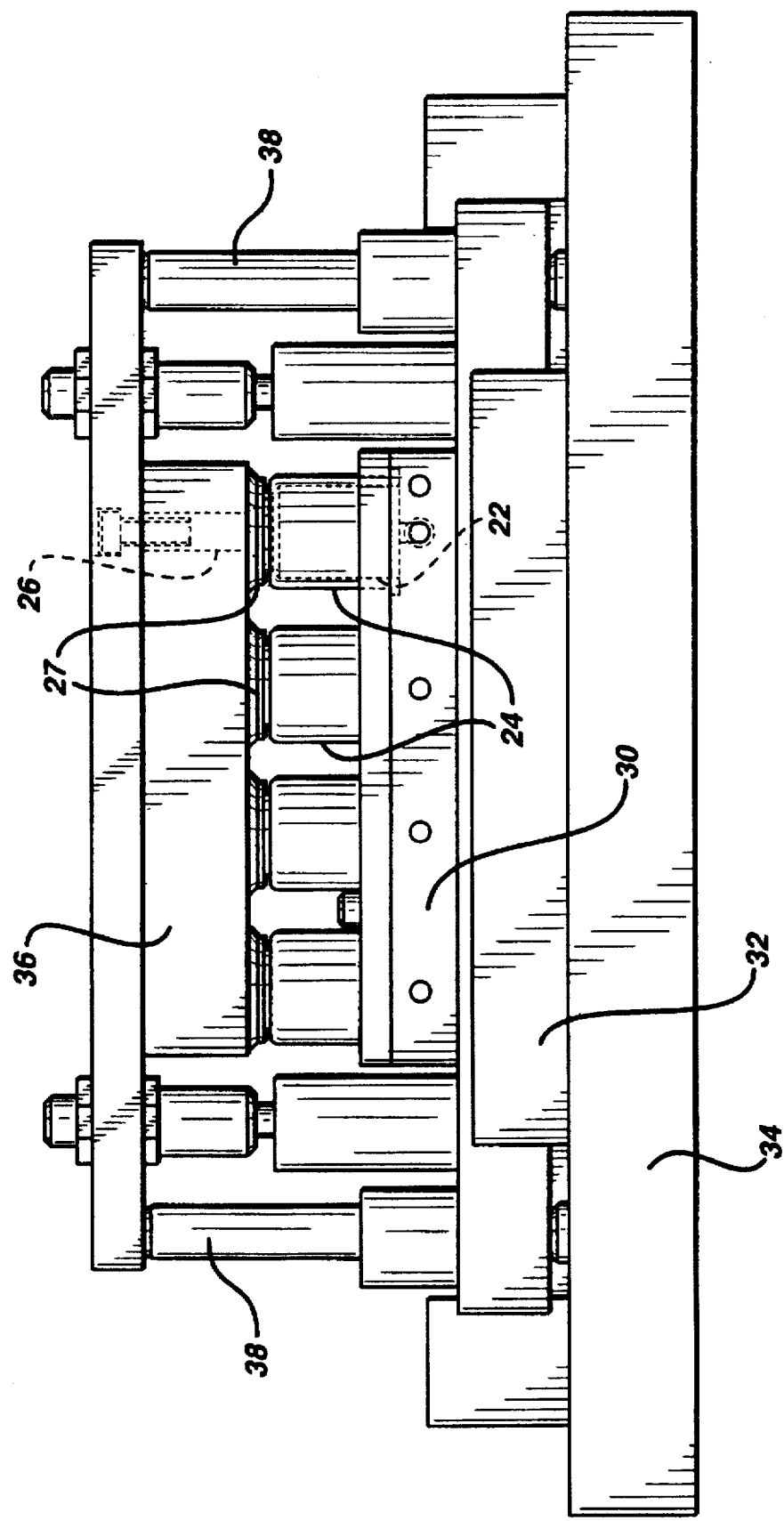
FIG. 3 shows in cross-section the apparatus of the present invention containing the electrodes of FIG. 2 for treating multiple male mold pieces.

Referring now to FIG. 3, there is shown a plurality of electrodes and counter-electrodes in an assembly used to treat a plurality of mold pieces. As shown in FIG. 2 there is also shown herein piece support 22, electrode 24 and counter-electrode 26. Not shown is a mold piece for treatment.

This Figure also shows in the apparatus, electroplate 30 which supplies a common voltage to electrodes 24 as well as insulating support 32 attached to mounting plate 34. Counter-electrodes 26 are supported by mount 36 and the assembly rides on guide rods 38. By movement of guide rods 38, the mount 36 can move the counter-electrodes 26 away from the electrodes 24 and piece support 22 allowing easy insertion and removal of the mold pieces.

In performing the actual treatment, the electrodes are placed between 0.25 mm and 0.5 mm from the surface of the mold piece to be treated.

While the exact mechanism causing the polymerized material to adhere to the corona treated polystyrene is not known, electrical surface treatment effectiveness has been linked by theory to such phenomenon as ablation (surface degradation), cross linking of the polymer, oxidation, hydrogen bonding and electret formation. While the mechanism is unclear, it has been found that one of the parameters effecting the strength of adhesion between the polystyrene and the lens polymer is the amount of oxygen present before and during treatment of the mold surface. Generally, the lower the oxygen level, the lower the bound oxygen to the surface, and the less adhesion between the polystyrene and the lens polymer. For this reason it is best that oxygen contact with the polystyrene molds be minimized prior to treatment.

Other parameters effecting the adhesion strength are power of the electrodes and time of treatment as well as treatment frequency and voltage.

For the present invention it was found that a treatment voltage of about or greater than 10 kV at a frequency of about or greater than 20 kHz preferably from about 20 kHz to 30 kHz with a power between 10 watts and 80 watts, with 30 watts preferred, for a period of at least about 0.2 seconds gave the best results. In the preferred embodiment with an electrode diameter of 0.79 inches, a power of 22 watts and a treatment time of 0.3 seconds in an ambient atmosphere, 100% of the flashing was removed with the convex male mold piece 20, while only 0.5% of the lenses being improperly retained by the convex male mold piece 20.

Figure 4:
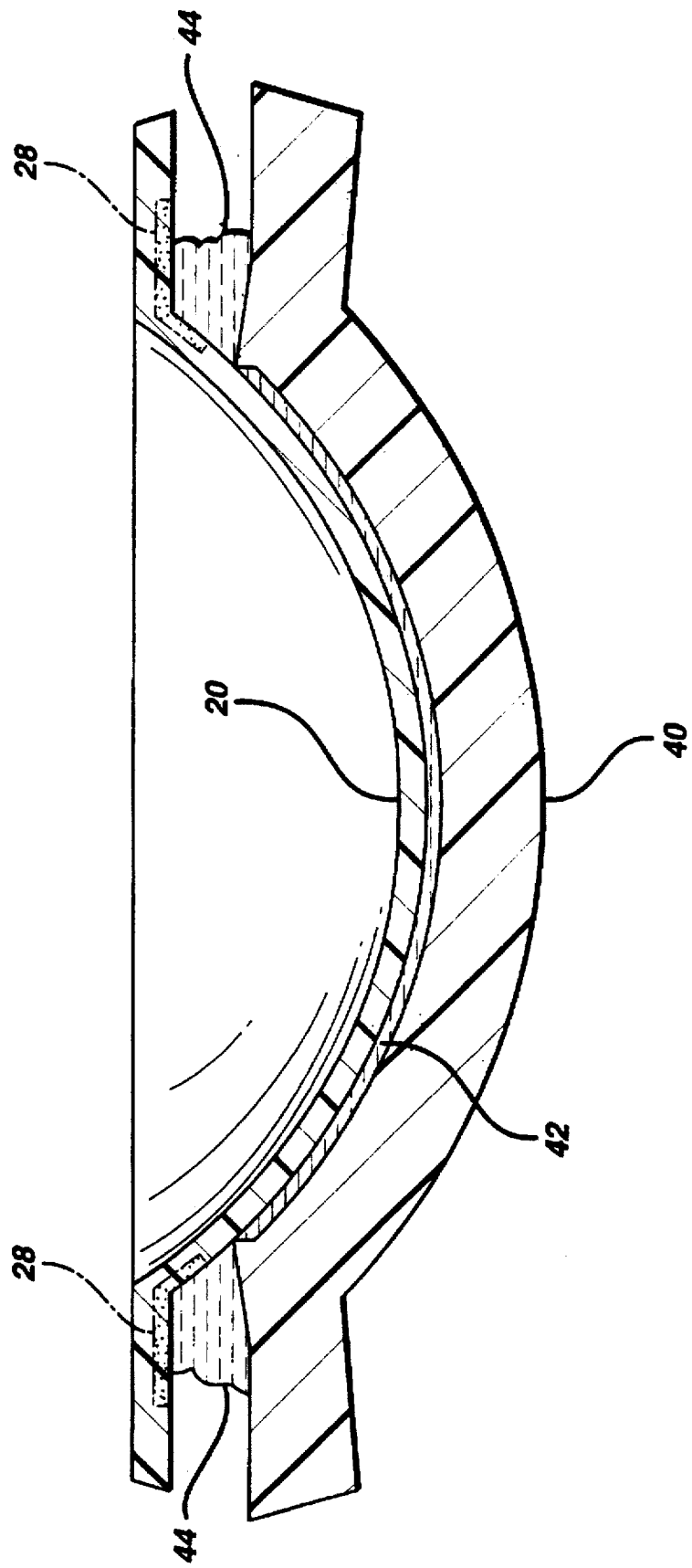
FIG. 4 shows in cross-section a pair of mated mold pieces.

Referring now to FIG. 4, there is shown the mated mold pieces including the concave, female mold piece 40. Between the pair of mated mold pieces is lens 42 and external to the lens, around the periphery and between the flanges of mold pieces 20 and 40, is flashing 44. The relative position of the area exposed to corona treatment 28 with respect to the lens and flashing is now apparent.

As can be appreciated by one skilled in the art an excessive increase in any of these parameters causes migration of the treatment into the lens surface of the convex male mold piece that results in adhesion of the lens to the male mold piece.

It has been found that if there is no oxygen present during the electrode discharge to the target surface, neither extended treatment times or higher power causes the flashing to stick to the target surface. In short, it is believed that corona treatment causes oxygen to ionize and bind to a specific area of the convex mold piece to chemically alter the surface.

Under certain manufacturing conditions, however, it is preferred to maintain to the extent possible, an oxygen-free environment about the mold and monomer. For this reason, the manufacturing process is done under an inert gas environment, preferably nitrogen, until the lens is polymerized. To meet this requirement and still practice the present invention, a special fixture is required.

Figure 5:
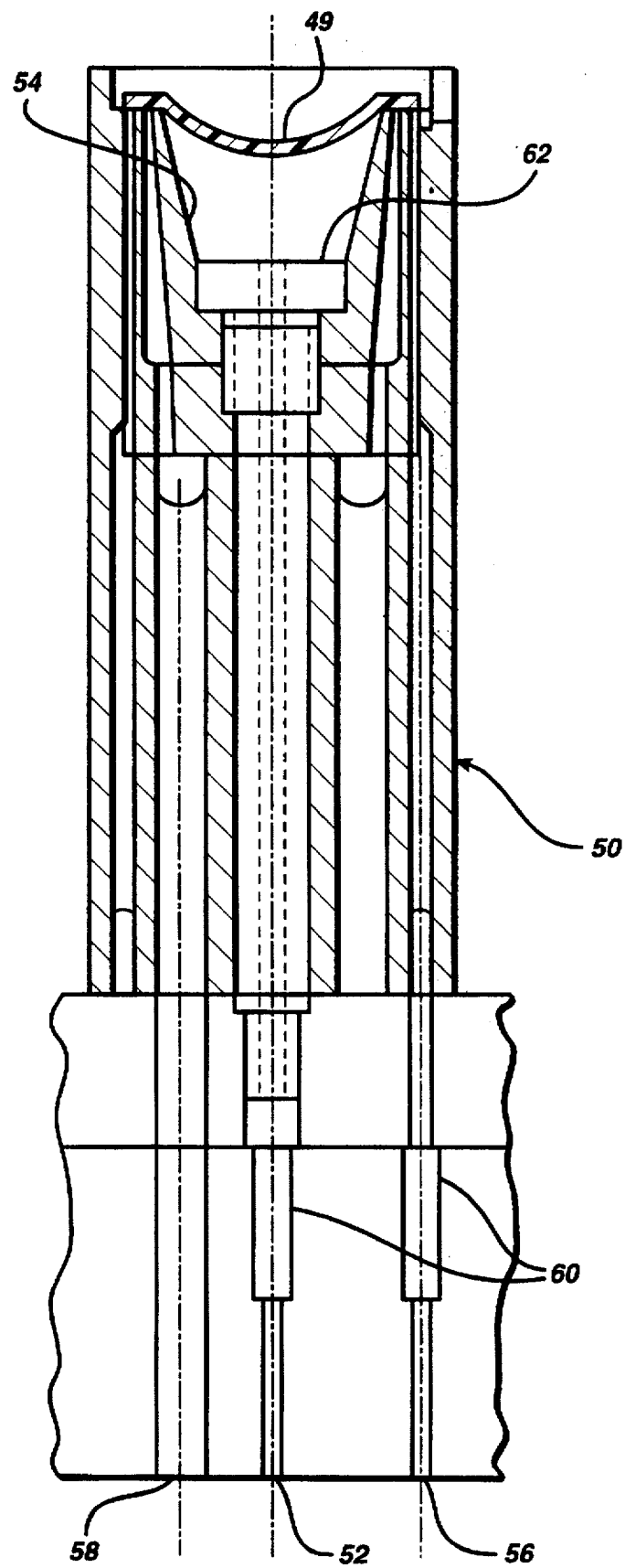
FIG. 5 is a cross-sectional view of a corona treatment process gas flow manifold used in particular applications of the invention.

Referring to FIG. 5, there is shown a process gas flow manifold used to practice the invention under otherwise oxygen-free conditions. This manifold supplies an oxygen bearing gas, air, to the area to be treated while preventing the oxygen from contaminating the lens manufacturing area of the molds or diluting the nitrogen atmosphere of other lens process areas.

A mold piece 49 sits atop housing 50 constructed of Lexan and containing three concentric annuluses. Nitrogen gas is supplied to a supply means such as center annulus 52, travels the length of the housing and washes over the lens-forming portion of the mold piece by way of nitrogen cup 54. As a non-reactive gas, nitrogen permits the lens-forming portion of the mold to remain unaffected by the treatment. Oxygen containing air is supplied through a supply means such as housing outer annulus 56 and ultimately flows over the flange area desired to be treated.

A vacuum is drawn from the middle annulus 58 ensuring that the $N_2$ and $O_2$ gases flow over the desired areas, but do not intermix. The flow of gases is kept balanced by appropriate sizing of orifices 60. The process is performed in the following sequence: The movable manifold is positioned to engage mold piece 49, vacuum is drawn through the middle annulus via line 58, as $N_2$ g flow. $O_2$ bearing gas, such as air, is then supplied to the outer annulus via line 56. Corona treatment is initiated when voltage is applied to electrode 62 as the gas flow is maintained. The $O_2$ source is shut off and the oxygen bearing gas removed by the vacuum as it is replace by $N_2$ flow via line 52. Finally, after the treatment cycle is completed (approximately 0.2 seconds), the gas flow is ceased, the movable manifold is withdrawn and the mold piece removed and the next piece put in place.

Following treatment and filling with monomer, the monomer is then caused to polymerized by chemical, thermal or ultraviolet means of polymerization initiation. After polymerization is completed, the male and female portions of the mold pair are separated and the lens is removed.

We claim:

1. An apparatus for treating an ophthalmic lens mold, comprising a flange and a lens molding area, to cause a lens after molding to separate from its associated flashing by preferentially retaining the flashing to the flange of a treated mold piece, said apparatus comprising:

means for providing accelerated electrons to said flange, means for directing said electrons toward the flange and away from the lens molding area of the mold piece.

2. The apparatus of claim 1 further comprising:

oxygen supply means providing an oxygen-bearing gas to the flange, means to provide an inert gas to the lens molding area.

3. The apparatus of claim 1 wherein said means for providing accelerated electrons and means for directing said electrons toward the mold surface comprises:

an electrode proximate a first surface located on one side of the flange of the mold to be treated, a counter-electrode on or near a second surface located on a side opposite the first surface, and a source of electrical power with a voltage about or greater than 10 kV at a frequency about or greater than 20 kHz, said source electrically connected to said electrode and said counter-electrode.

* * * * *